United States Patent
Shin et al.

(10) Patent No.: US 8,149,812 B2
(45) Date of Patent: Apr. 3, 2012

(54) METHOD AND APPARATUS FOR RETRANSMITTING DATA IN WIRELESS LAN SYSTEM USING VISIBLE LIGHT COMMUNICATION

(75) Inventors: Hong-Seok Shin, Suwon-si (KR); Dong-Ho Cho, Seoul (KR); Hyu-Dae Kim, Daejeon (KR); Chi-Sung Bae, Daejeon (KR); Soo-Yong Jeon, Daejeon (KR); Woo-Chan Kim, Daejeon (KR); Sung-Yeop Pyun, Daejeon (KR)

(73) Assignees: Samsumg Electronics Co., Ltd., Suwon-Si, Gyeonggi-do (KR); Korea Advanced Institute of Science & Technology (Kaist), Yuseong-gu, Daejeon (KR)

( * ) Notice: Subject to any disclaimer, the term of this patent is extended or adjusted under 35 U.S.C. 154(b) by 283 days.

(21) Appl. No.: 12/210,364

(22) Filed: Sep. 15, 2008

(65) Prior Publication Data

US 2009/0073952 A1 Mar. 19, 2009

(30) Foreign Application Priority Data

Sep. 13, 2007 (KR) ........................ 10-2007-0093162

(51) Int. Cl.
*H04J 3/00* (2006.01)
*H04J 3/14* (2006.01)
*H04B 7/212* (2006.01)
*H04W 4/00* (2009.01)
*G06F 11/00* (2006.01)

(52) U.S. Cl. ........ 370/345; 370/321; 370/336; 370/338; 370/216

(58) Field of Classification Search .................. 370/328, 370/338, 310, 216, 321, 329, 337, 347, 442, 370/458
See application file for complete search history.

(56) References Cited

U.S. PATENT DOCUMENTS

| | | | |
|---|---|---|---|
| 4,641,304 A * | 2/1987 | Raychaudhuri | 370/447 |
| 5,303,234 A * | 4/1994 | Kou | 370/442 |
| 5,594,738 A * | 1/1997 | Crisler et al. | 370/347 |
| 5,640,390 A * | 6/1997 | Sakamoto et al. | 370/346 |
| 5,896,385 A * | 4/1999 | Achilleoudis | 370/443 |
| 5,896,402 A * | 4/1999 | Kurobe et al. | 714/748 |
| 6,151,329 A * | 11/2000 | Berrada et al. | 370/447 |
| 6,408,009 B1 * | 6/2002 | Campbell et al. | 370/461 |
| 6,567,416 B1 * | 5/2003 | Chuah | 370/418 |
| 7,042,869 B1 * | 5/2006 | Bender | 370/364 |
| 7,133,396 B1 * | 11/2006 | Schmidl et al. | 370/347 |
| 7,420,950 B2 * | 9/2008 | Barak et al. | 370/337 |
| 2002/0018458 A1 * | 2/2002 | Aiello et al. | 370/348 |
| 2004/0116126 A1 * | 6/2004 | Cave et al. | 455/450 |
| 2005/0281243 A1 * | 12/2005 | Horn et al. | 370/345 |
| 2006/0111129 A1 * | 5/2006 | Ihm et al. | 455/466 |
| 2006/0198325 A1 * | 9/2006 | Gao et al. | 370/270 |
| 2007/0064646 A1 * | 3/2007 | Esteves et al. | 370/329 |
| 2010/0226295 A1 * | 9/2010 | Sun et al. | 370/294 |

* cited by examiner

*Primary Examiner* — Warner Wong
(74) *Attorney, Agent, or Firm* — Cha & Reiter, LLC

(57) ABSTRACT

A method for retransmitting data when data transmission/reception has failed in a wireless LAN system using visible light communication. A mobile node searches a received frame for a fast feedback slot allocated for retransmission information when momentary data transmission/reception failure has occurred. One mini-slot from among the plurality of mini-slots is selected from the fast feedback slot. The mobile node transmits a fast feedback message, including information for retransmission, to an access point by using the selected mini-slot.

22 Claims, 4 Drawing Sheets

METHOD AND APPARATUS FOR RETRANSMITTING DATA IN WIRELESS LAN SYSTEM USING VISIBLE LIGHT COMMUNICATION

CLAIM OF PRIORITY

This application claims the benefit of priority under 35 U.S.C. §119(a) from an application entitled "Method and Apparatus for Retransmitting Data in Wireless LAN System using Visible Light Communication" filed in the Korean Intellectual Property Office on Sep. 13, 2007 and assigned Serial No. 2007-93162, the contents of which are hereby incorporated by reference in its entirety.

BACKGROUND OF THE INVENTION

1. Field of the Invention

The present invention relates to a system for visible light communication. More particularly, the present invention relates to a protocol for a wireless Local Area Network (LAN) system using visible light communication regarding retransmission of data, and an apparatus using the same.

2. Description of the Related Art

Recent improvements in the luminous efficiency of Light Emitting Diodes (LEDs) and improvements in their manufacture have resulted in a significant decrease in their purchase price. As a result, LEDs have become popular in general lighting markets, including markets formerly catering to sales of fluorescent lamps and glow lamps, as well as special lighting markets including markets of portable devices, displays, vehicles, traffic lights, billboards, etc. In particular, white LED has already surpassed glow lamps in terms of luminous efficiency, and white LED products superior to fluorescent lamps have recently emerged.

Moreover, in the field of wireless communications, various factors (e.g. the exhaustion of RF bandwidth, interference possibilities between several wireless communication technologies, an increasing demand for communication security, advent of an ultra-high speed ubiquitous communication environment based on 4 G wireless technologies, etc.) have increased interest in visible-light wireless communication technologies complementary to RF technologies, and the improvements in LED technology has heightened such interest. Accordingly, research on visible-light wireless communication employing a visible light LED is now in progress by many enterprises and laboratories.

There is an expectation that in the near future fluorescent lamps and glow lamps currently being used for lighting in homes, offices, and public places will in all likely be replaced by LEDs having higher performance and longer life.

An advantage of LEDs is that if current applied to an LED used for lighting is modulated, the LED for lighting can also be utilized as a communication light source. That is, it is possible to broadcast and transmit data only through an LED for lighting, without adding an additional light source. A user operating a mobile terminal or a notebook computer in a place where LED lighting is present can perform wireless LAN-type data communication by using a visible-light wireless transmission/reception module.

Wireless visible light communication differs greatly from other wireless RF communications in that a user can visually identify a data transmission/reception process, and visible light (i.e. a transmission medium) is characterized by high directivity of a signal and short transmission/reception distance of data. Due to the directivity of a signal, when an object passes (interferes) between the light path of LEDs of an access point (AP) and a mobile node (MN), a signal cut-off phenomenon may occur, thereby causing momentary data transmission/reception failure. The worse the channel condition is, and the more frequently the obstacle appears, the more frequently the momentary data transmission/reception failure occurs.

Therefore, there is a need in the art to develop a scheme for immediately recognizing momentary data transmission/reception failure(s) and enabling unsuccessfully received data to be rapidly re-transmitted.

SUMMARY OF THE INVENTION

Accordingly, the present invention provides a method for enabling an access point to rapidly retransmit data when momentary data transmission/reception failure occurs between the access point and a mobile node in a wireless LAN system using visible light communication.

In accordance with an exemplary aspect of the present invention, there is provided a method for retransmitting data when data transmission/reception has failed in a wireless LAN system using visible light communication, the method including exemplary steps of: searching, by a mobile node, a received frame for a fast feedback slot allocated for retransmission information when momentary data transmission/reception failure has occurred; selecting one mini-slot from among mini-slots included in the fast feedback slot when the fast feedback slot exists; and transmitting, by the mobile node, a fast feedback message, including information for retransmission, to an access point by using the selected mini-slot.

Preferably, the method further includes receiving, by the access point, the fast feedback slot; searching, by the access point, the received fast feedback slot for a mini-slot including the fast feedback message; and analyzing, by the access point, the fast feedback message included in the mini-slot, and retransmitting transmission/reception failure data.

Preferably, according to an exemplary aspect of the present invention, the fast feedback slot includes at least one mini-slot, and the fast feedback slot is allocated to a slot used for data transmission, or is allocated to a slot for control information transmission, such as an initial access slot used for initial access by the mobile node.

Preferably, according to an exemplary aspect of the present invention, in the step of selecting one mini-slot by the mobile node, the mobile node randomly selects one mini-slot from among mini-slots constituting the fast feedback slot.

Preferably, according to an exemplary aspect of the present invention, the mobile node sets the mini-slot to have a size large enough to contain information about a unique ID of the mobile node and information about unsuccessfully transmitted/received data.

Preferably, according to an exemplary aspect of the present invention, the fast feedback message includes information about data which the mobile node has failed to receive from the access point, and information about a unique ID of the mobile node; the information about the data which the mobile node has failed to receive from the access point includes information (e.g. a block sequence number) about a unsuccessfully received data block or information (e.g. a frame sequence number) about a frame which the mobile node has failed to receive; and the information about the unique ID of the mobile node includes information about a unique Media Access Control (MAC) address of the mobile node, or information about a mobile node-based or flow-based connection identifier allocated from the access point.

In accordance with another exemplary aspect of the present invention, there is provided an apparatus for retransmitting data when data transmission/reception has failed in a wireless LAN system using visible light communication, the apparatus including: a mobile node for searching a received frame for a fast feedback slot allocated for retransmission information when momentary data transmission/reception failure has occurred, selecting one mini-slot from among a plurality of mini-slots constituting the fast feedback slot, and transmitting a fast feedback message including information for retransmission to an access point by using the selected mini-slot; and the access point for receiving the fast feedback slot, searching the fast feedback slot for a mini-slot including the fast feedback message, analyzing the fast feedback message included in the mini-slot, and retransmitting the unsuccessfully transmitted/received data.

The present invention operates in accordance with the configuration and allocation method of the fast feedback slot, and the configuration method and transmission procedure of fast feedback information by a Mobile Node (MN). Hereinafter, the present invention will be described in more detail.

BRIEF DESCRIPTION OF THE DRAWINGS

The above and other exemplary aspects, features and advantages of the present invention will become more apparent from the following detailed description taken in conjunction with the accompanying drawings, in which.

DETAILED DESCRIPTION

Hereinafter, an apparatus and an operational method for exemplary embodiments of the present invention will be described with reference to the accompanying drawings. The following description regarding retransmission of data in VLC communications is provided for explanatory purposes to a person of ordinary skill in the art. Accordingly, the claimed invention is not limited to the examples shown and described herein. Furthermore, the detailed description may omit certain known subject matter when its inclusion may obscure appreciation of the present invention by an artisan.

Figure 1:
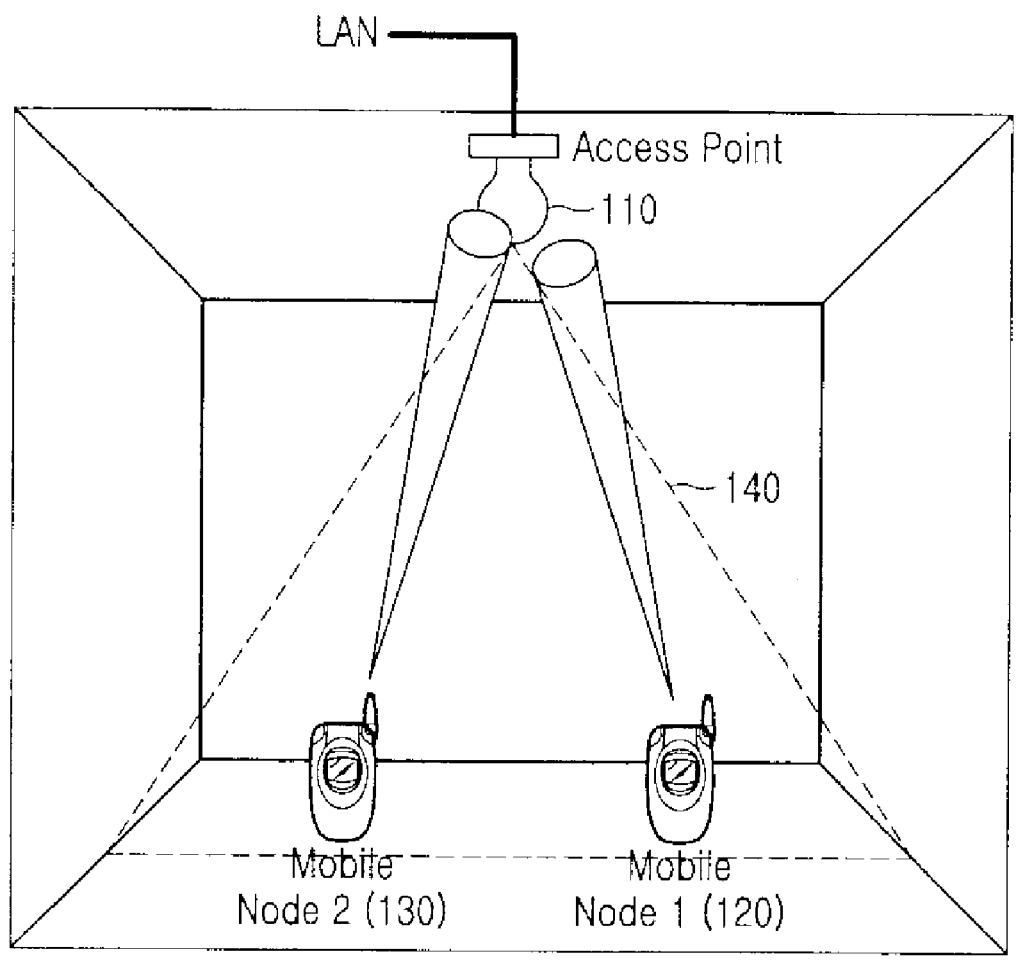
FIG. 1 is a view illustrating the configuration of a wireless LAN system using visible light communication to which the present invention is applied.

FIG. 1 is a view illustrating the configuration of a wireless LAN system using visible light communication to which the present invention is applied. The wireless LAN system using visible light communication includes an access point (AP) 110 and mobile nodes (MNs) 120 and 130. Each AP 110 in the LAN system has its own coverage area 140 and can communicate with the MNs 120 and 130 located in the coverage area 140. The MNs 120 and 130 have mobility, and perform wireless communication with the AP 110 by using visible light as a communication medium when they are located in the coverage area 140 of the AP 110.

Since the wireless LAN system to which the present invention is applied uses visible light (VLC) as a communication medium, and VLC permits the user to visually identify communication security as well as a data transmission/reception process, and it is possible to implement the wireless LAN system with low power. Therefore, the user can easily identify the locations of transmitting and receiving points, and also can visually identify communication paths.

The present invention provides a method for enabling an AP to rapidly retransmit data when momentary data transmission/reception failure occurs between the AP and an MN in a wireless LAN system using visible light communication.

In order to rapidly re-transmit the data that failed to be transmitted in whole or part, this particular example of the present invention assumes an environment where time slots are used based on a Time Division Multiple Access (TDMA) scheme. In the present invention a terminal (i.e. a Mobile Node "MN") rapidly requests the AP to retransmit data by using a fast feedback slot, without a resource allocation procedure, when there exists an AP and multiple MNs connected to the AP in such an environment.

Exemplary Configuration of a Fast Feedback Slot

Figure 2:
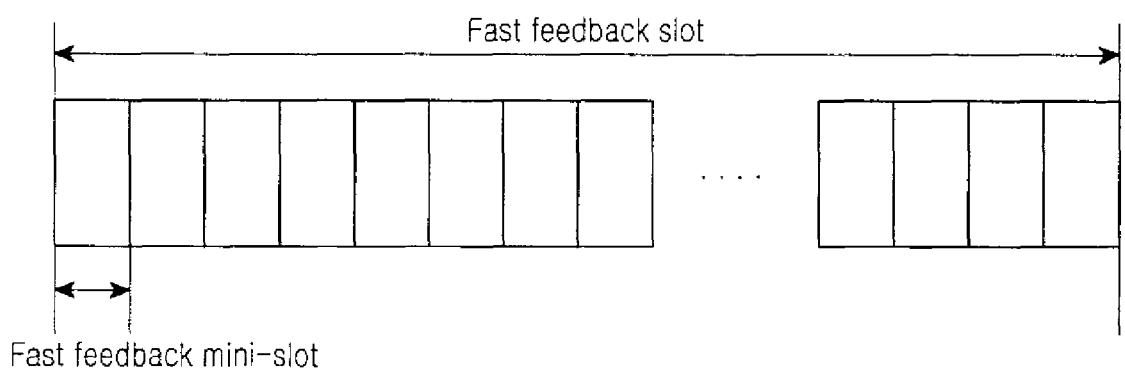
FIG. 2 is a view schematically illustrating the configuration of a fast feedback slot according to according to an exemplary embodiment of the present invention.

FIG. 2 is a view schematically illustrating the configuration of a fast feedback slot according to according to an exemplary embodiment of the present invention. The fast feedback slot comprises a plurality of mini-slots. The fast feedback slot may be configured by using one or multiple unit-slots which are provided by a system.

To reiterate, one or more slots allocated as a fast feedback slot include a plurality of mini-slots, each of which is set to have a size large enough for an MN to transmit information about its own ID and information about unsuccessfully transmitted/received data.

Exemplary Method of Allocating the Fast Feedback Slot

The fast feedback slot may be allocated by using one or multiple unit-time slots provided by the system. Also, the fast feedback slot may be allocated every frame, or may be allocated every predetermined period. In addition and/or contrast, the fast feedback slot may be non-periodically allocated by utilizing the remaining slots by the AP.

Also, the fast feedback slot may be allocated by employing a slot that is used for transmission of an MN's pure data in the system, or by employing a slot for control information transmission, such as an initial access slot used for an initial access of the MN. For such an operation, it is necessary to transmit information about where to use a slot for control information transmission.

Exemplary Method for Configuring a Fast Feedback Message of the MN

Data to be transmitted through the fast feedback slot by the MN is preferably constructed as follows. The fast feedback message includes information about data which the MN fails to receive from the AP, and information about a unique ID of the MN.

In order to represent information about data which the MN has failed to receive from the AP, the MN may transmit information about unsuccessfully received data block (e.g. a block sequence number in a case where ARQ is used), or the MN may transmit information about a reception-failed frame (e.g. a frame sequence number). The MN may use its own unique Media Access Control (MAC) address, or an MN-based or flow-based connection identifier allocated from the AP, as a unique ID of the MN.

Procedure of Transmitting the Fast Feedback Message

Figure 3:
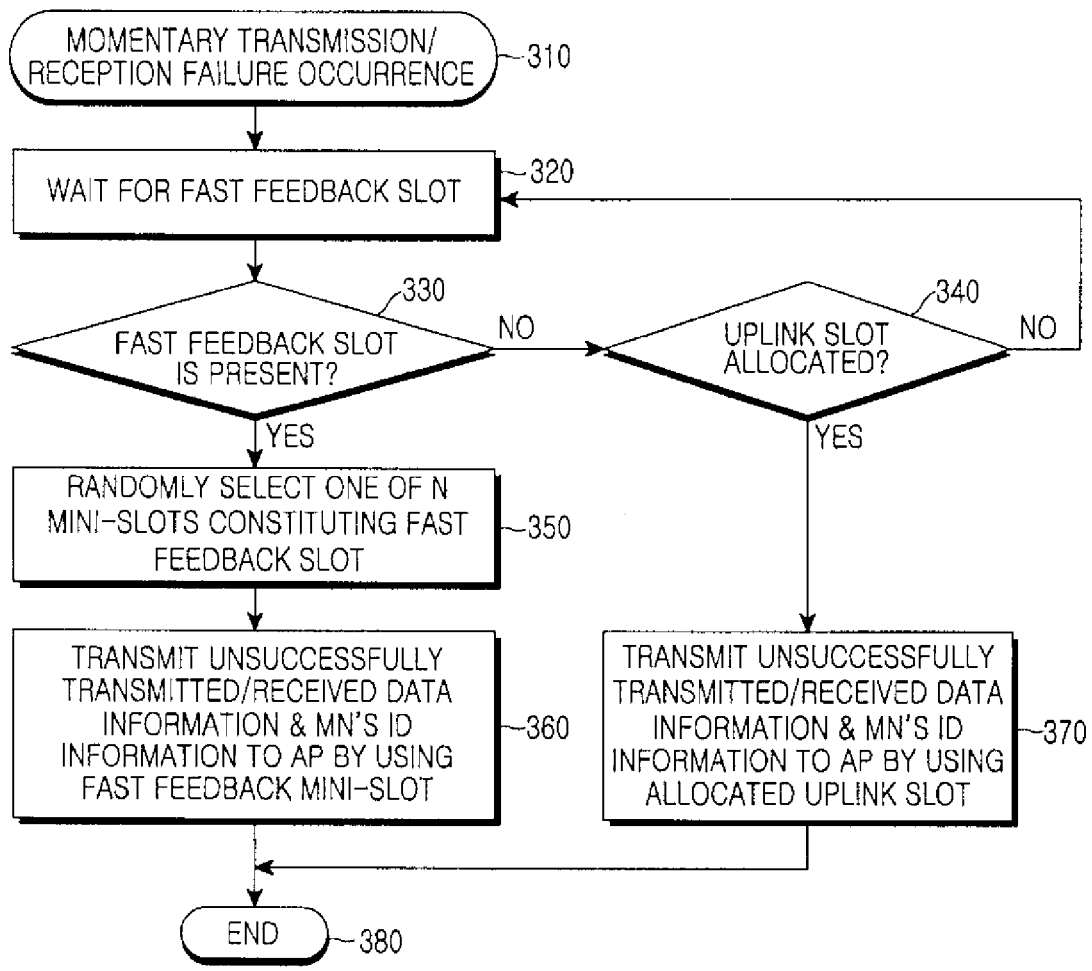
FIG. 3 is a flowchart illustrating an operation of transmitting a fast feedback message by a mobile node in a wireless LAN system using visible light communication according to an exemplary embodiment of the present invention.

FIG. 3 is a flowchart illustrating an exemplary operation of transmitting a fast feedback message by an MN in a wireless LAN system using visible light communication according to an exemplary embodiment of the present invention. FIG. 3 illustrates one example of a procedure for transmitting fast feedback information by the MN. First, when momentary signal transmission/reception failure occurs in step 310, the method proceeds to step 320, where the MN waits for a fast feedback slot from an AP.

In step 330, the MN determines whether a frame received from the AP includes a fast feedback slot. When the received frame includes a fast feedback slot allocated thereto, the MN proceeds to step 350, where the MN randomly selects one mini-slot from among N fast feedback mini-slots constituting the fast feedback slot.

In step 360, the MN transmits a fast feedback message, which includes MN's ID information and information about unsuccessfully received data, to the AP by using the selected fast feedback mini-slot.

In contrast, when it is determined that the frame includes no fast feedback slot allocated thereto as a result of step 330, the method proceeds to step 340, where the MN determines if an uplink slot has been allocated to the MN. When an uplink slot, such as that in a polling scheme, has been allocated to the MN, the method proceeds to step 370, where the MN transmits the fast feedback message, including the MN's ID information and information about unsuccessfully received data, to the AP by using the allocated uplink slot.

In contrast, when it is determined that the uplink slot has not been allocated to the MN as a result of step 340, the method returns to step 320, where the MN waits for a fast feedback slot.

After transmitting a fast feedback message in steps 360 or 370, the MN proceeds to step 380, where the operation of the MN regarding retransmission is terminated.

Figure 4:
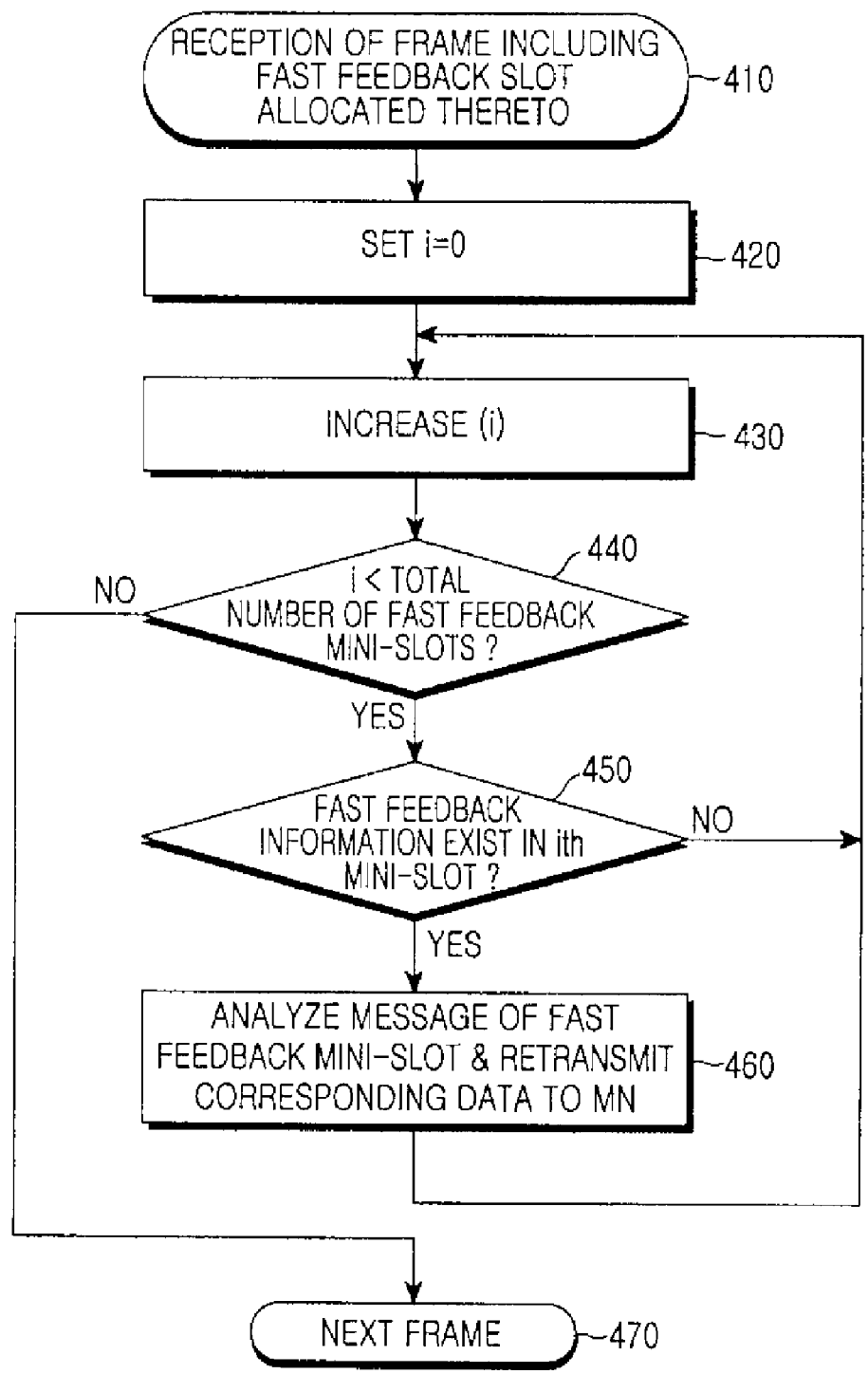
FIG. 4 is a flowchart illustrating an operation of receiving a fast feedback message by an access point in a wireless LAN system using visible light communication according to an exemplary embodiment of the present invention.

FIG. 4 is a flowchart illustrating an exemplary operation of receiving a fast feedback message by the AP in a wireless LAN system using visible light communication according to an exemplary embodiment of the present invention.

According to the operation of receiving a fast feedback message by the AP in the wireless LAN system using visible light communication according to an exemplary embodiment of the present invention.

First, when the AP has received a frame including a fast feedback slot allocated thereto in step 410, the AP defines variable "i" and sets i=0 in step 420 in order to search the received fast feedback slot for a mini-slot including the fast feedback message.

In step 430, the AP performs an operation of increasing variable "i" by one by using a function of "inc ( )", wherein function "inc ( )" corresponds to "i=i+1").

In step 440, the AP compares the value of i with the total number of mini-slots in the fast feedback slot. When it is determined that the value of i is less than the total number of mini-slots in the fast feedback slot as a result of step 440, the method proceeds to step 450, where the AP determines whether the $i^{th}$ mini-slot of the fast feedback slot includes the fast feedback message.

Upon determination that the $i^{th}$ mini-slot of the fast feedback slot includes the fast feedback message as a result of step 450, the method proceeds to step 460, where the AP analyzes the fast feedback message and then retransmits unsuccessfully received data to a corresponding MN.

In contrast, when it is determined that the $i^{th}$ mini-slot of the fast feedback slot does not include the fast feedback message as a result of step 450, the method directly proceeds to step 430, where the MN increases the value of variable "1" increases by one.

Meanwhile, when it is determined that the value of i is not less than the total number of mini-slots in the fast feedback slot as a result of step 440, the method proceeds to step 470, where the reception operation is terminated.

According to the aforementioned operation of the present invention, when an MN momentarily fails to receive data from an AP in a wireless LAN system using visible light communication, the MN can rapidly receive unsuccessfully received data again from the AP by using a fast feedback slot, without an additional resource request procedure.

According to the present invention, when an MN fails to receive data from an AP in a wireless LAN system using visible light communication, the MN transmits information about unsuccessfully received data through a fast feedback slot in a competitive scheme, so that the AP can rapidly retransmit corresponding data, without an additional resource request procedure.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for retransmitting data when data transmission/reception has failed in a wireless LAN system using visible light communication, the method comprising the steps of:
    searching a received frame for a fast feedback slot allocated for retransmission information by a mobile node when a data transmission/reception failure has occurred;
    selecting a mini-slot from among a plurality of mini-slots included in the fast feedback slot; and
    when the mobile node detects a momentary failure in reception of a visible light communication transmission by an access point transmitting a fast feedback message by the mobile node using visible light communication, including information for retransmission that does not include a specific request for retransmission, to an access point by using the selected mini-slot without a resource allocation procedure when a plurality of mobile nodes are connected to the access point.

2. The method as claimed in claim 1, further comprising the steps of:
    the access point receiving the fast feedback slot transmitted by the mobile node;
    the access point searching the received fast feedback slot for a mini-slot including the fast feedback message; and
    the access point analyzing the fast feedback message included in the mini-slot, and retransmitting the data for which the transmission/reception has occurred without a resource request procedure.

3. The method as claimed in claim 1, wherein the fast feedback slot comprises at least one mini-slot.

4. The method as claimed in claim 1, wherein the selecting step comprises selecting a plurality of mini-slots, and transmitting the mini-slots to the access point.

5. The method as claimed in claim 1, wherein the fast feedback slot is allocated to a slot used for one of data transmission and for control information transmission.

6. The method as claimed in claim 1, wherein the fast feedback slot comprises an initial access slot for initial access by the mobile node.

7. The method as claimed in claim 1, wherein, in the step of selecting the mini-slot by the mobile node, the mobile node randomly selects the mini-slot from among mini-slots constituting the fast feedback slot.

8. The method as claimed in claim 1, wherein the mobile node sets the mini-slot to have a size sufficient to contain information about a unique ID of the mobile node, and information about unsuccessfully transmitted/received data.

9. The method as claimed in claim 1, wherein the fast feedback message includes information about data which the mobile node has failed to receive from the access point, and information about a unique ID of the mobile node.

10. The method as claimed in claim 9, wherein the information about the data which the mobile node has failed to receive from the access point comprises identifying information about a unsuccessfully received data block or information about a frame which the mobile node has failed to receive.

11. The method as claimed in claim 10, wherein the identifying information about an unsuccessfully received data block comprises a block sequence number.

12. The method as claimed in claim 10, wherein the identifying information about an unsuccessfully received comprises a frame sequence number.

13. The method as claimed in claim 9, wherein the information about the unique ID of the mobile node comprises information about at least one of a unique Media Access Control (MAC) address of the mobile node, or information about a mobile node-based/flow-based connection identifier allocated from the access point.

14. A method for retransmitting data when data transmission/reception has failed in a wireless LAN system using visible light communication, the method comprising the steps of:
  searching a received frame for a fast feedback slot allocated for retransmission information by a mobile node when a data transmission/reception failure has occurred;
  if the fast feedback slot is not found, determining whether an uplink slot has been allocated;
  if the uplink slot has been allocated, retransmitting the data transmission/reception that has failed using the uplink slot.

15. An apparatus for retransmitting data when data transmission/reception has failed in a wireless LAN system using visible light communication, the apparatus comprising:
  a mobile node for searching a received frame via visible light communication for a fast feedback slot allocated for retransmission information when momentary data transmission/reception failure has occurred, for selecting one mini-slot from among a plurality of mini-slots constituting the fast feedback slot, and for transmitting a fast feedback message via visible light communication including information for retransmission to an access point that does not include a specific request for retransmission by using the selected mini-slot without a resource allocation procedure when a plurality of mobile nodes are connected to the access point; and
  the access point for receiving the fast feedback slot, for searching the fast feedback slot for a mini-slot including the fast feedback message, for analyzing the fast feedback message included in the mini-slot, and for retransmitting the unsuccessfully transmitted/received data to the mobile node without an additional resource request procedure.

16. The apparatus as claimed in claim 15, wherein the fast feedback slot includes at least one mini-slot.

17. The apparatus as claimed in claim 15, wherein the fast feedback slot is allocated to one of a slot for data transmission, and a slot for control information transmission including an initial access slot for providing initial access by the mobile node.

18. The apparatus as claimed in claim 15, wherein the mobile node for randomly selecting one mini-slot from among a plurality of mini-slots constituting the fast feedback slot.

19. The apparatus as claimed in claim 15, wherein the mobile node sets the mini-slot to have a size sufficient for contain information about a unique ID of the mobile node and information about unsuccessfully transmitted/received data.

20. The apparatus as claimed in claim 15, wherein the fast feedback message includes information about data which the mobile node has failed to receive from the access point, and information about a unique ID of the mobile node.

21. The apparatus as claimed in claim 20, wherein the information about the data which the mobile node has failed to receive from the access point comprises one of a block sequence number about an unsuccessfully received data block or a frame sequence number about a frame which the mobile node has failed to receive.

22. The apparatus as claimed in claim 20, wherein the information about the unique ID of the mobile node comprises one of information about a unique Media Access Control (MAC) address of the mobile node, or information about a mobile node-based or flow-based connection identifier allocated from the access point.

* * * * *